United States Patent [19]

Cloots

[11] Patent Number: 4,646,637

[45] Date of Patent: Mar. 3, 1987

[54] METHOD AND APPARATUS FOR FLUIDIZED BED COMBUSTION

[76] Inventor: Henry R. Cloots, 10 Oak Brook Pl., Pleasant Hill, Calif. 94523

[21] Appl. No.: 813,587

[22] Filed: Dec. 26, 1985

[51] Int. Cl.⁴ ............................ F23G 5/00; F23G 7/00
[52] U.S. Cl. .................................... 110/245; 110/115; 110/256; 110/347; 122/4 D
[58] Field of Search ............... 110/256, 102, 245, 347, 110/275, 276, 115; 431/7, 170; 122/4 D; 165/104.16

[56] References Cited

U.S. PATENT DOCUMENTS 3,840,345 10/1974 Andre et al. .................... 110/275 X
4,284,401 8/1981 Tatebayashi et al. .................. 431/7

*Primary Examiner*—Edward G. Favors
*Attorney, Agent, or Firm*—Schapp and Hatch

[57] ABSTRACT

A method and apparatus for fluidized bed construction in which the fluidized bed is confined in an annular combustion chamber and fuel is injected into the lower portion of the fluidized bed by a centrally located whirling disk having vanes thereon for impelling the fuel and secondary air laterally outwardly. Primary air is provided from a blower jointly driven with the fuel distribution disk and supplying air under pressure to pass upwardly through air supply openings in a grate forming the bottom wall of the combustion chamber, with the jets of air passing through the openings having upward and tangential components of movement so as to impart rotary motion to the fluidized bed in the annular combustion chamber.

34 Claims, 11 Drawing Figures

METHOD AND APPARATUS FOR FLUIDIZED BED COMBUSTION

BACKGROUND OF THE INVENTION

1. Field of the Invention

This invention relates to fluidized bed heating of materials, including combustion of carbonaceous fuels and/or carbon-based materials such as garbage and heat processing of divided materials.

2. Description of the Prior Art

The concept of Fluidized Bed Combustion (FBC) was established some years ago. In brief, in a fire box, air is blown up through a bed of particulate, non-combustible material such as sand to put the sand in a "fluidized" state in which the sand particles are in constant motion in the air stream, churning and tumbling like a boiling liquid. The particles are heated red hot, to about 900° Fahren-heit, which often is accomplished by injecting a burnable gas into the bed and igniting it. When the bed is hot, the start-up gas can be shut off and the primary fuel fed in.

The heat released by the burning fuel keeps the fluidized bed of sand incandescent, usually at about 1500° Fahrenheit. The hot sand stores heat so well that even cold, wet fuel, such as wet coal, does not appreciably chill the bed. Heat is transferred through direct contact with the hot sand particles, so that water tubes or air ducts immersed in the bed will collect heat much faster than in an ordinary boiler. This means that an FBC unit can be smaller than an ordinary boiler generating the same amount of heat, and can cost less.

FBC boilers burn low-grade fuels, everything from high-sulfur coal to rice hulls. Suitably designed, an FBC system can use wet coal mixed with rock. It can burn peat, heavy oil, oil shale, wood and wood waste including sawdust, urban and industrial trash and garbage, and even sewage sludge.

In addition to the ability to burn low-quality fuels, an FBC can keep emission of sulfur and nitrogen oxides relatively low, eliminating or reducing the need for emission control apparatus. This is in part due to the lower temperature combustion that can take place as compared to a conventional burner. At the lower temperatures, little of the nitrogen in air combines with oxygen to form nitrogen oxide. If the fuel contains sulfur, crushed limestone or dolomite (called "sorbent") is fed into the fluidized bed along with the fuel. The sulfur in the fuel reacts with the calcium in the red hot sorbent to form solid calcium sulfate which is trapped in the bed and removed along with the ash.

As high-quality fuels become scarce and expensive, the ability to use low-quality and low cost fuels becomes increasingly important. Along with the ability to reduce atmospheric pollutants, the FBC is becoming increasingly important as an energy conversion device. The potential of FBC as a device to dispose of solid and liquid waste, as separate from its heat generation role, is largely unexplored, and yet may be highly important, particularly in disposing of hazardous wastes which can be chemically modified by burning or being subjected to relatively high heat. Also largely uninvestigated is the use of FBC burners as process chemical reactors in which the heat of combustion is utilized to promote a chemical or physical change in a substance.

A number of different designs of FBCs have evolved, including variations of firebox designs and of subsystems to facilitate operation. Each design is an attempt to solve certain problems associated with FBCs, or to optimize conditions. Areas of concern are:

1. Feeding of Fuel.
2. Distribution of Fuel.
3. Feeding and Distribution of Limestone Sorbent.
4. Air Distribution, Fluidization and Turbulence.
5. Heat Output.
6. Heat Transfer.
7. Control of Output.
8. Control of Exhaust Gases and Particles.
9. Ash Control.
10. Cost and Complexity.

Feeding of fuel has proved to be one of the most difficult problems encountered. One aspect of the problem arises from the poor reliability of the mechanisms needed to feed coal and other solid fuels. This often results in a trade-off between "sizing" (crushing the fuel to a uniform size) to permit reliable handling, and using complex and inefficient mechanisms intended to handle all sizes of fuel. Another aspect of the same problem is the handling of different kinds and types of fuel with the same mechanism. The prior art generally builds each unit to handle one specific type of fuel, thus limiting the flexibility of use.

Perhaps the most important problem has been the choice of feeding fuel on top of the bed or on the bottom. Feeding on top of the bed is certainly the simplest method—however several drawbacks have been experienced. First, the fuel is being introduced where it can "flash" rather than being brought up to combustion temperature more gradually. The fuel is cold at this point and often wet. Introduction at a hot zone can cool the bed and exhaust gases just where heat transfer is intended. The fuel is also introduced at the point where oxygen is depleted, causing inefficient combustion.

If the fuel contains fine particles, they are very likely to be carried upwards to the heat transfer and exhaust area. The unburned fuel reduces combustion efficiency unless it is returned to the bed. Introduction of the fuel above the bed can also impede heat transfer by masking off the heat transfer tubes.

A more preferable point to introduce fuel is at the bottom of the bed, eliminating many of the problems mentioned above. However, most of the prior art mechanisms to introduce fuel at the bottom of the bed have been extremely complicated and costly, and have been inefficient because of being unable to accomplish even distribution of the fuel into the bed at the bottom thereof.

Uniform distribution of the fuel within the bed is an even greater problem. As the size of FBC units increase, the approach has been to provide multiple fuel feeding points, each with its own costly mechanism. Even multiple points have not fully solved the problem of obtaining evenness of distribution over the entire bed area, and underbed feeding distribution problems have not previously been solved.

Fluidized beds as developed so far tend to be rectangular "boxes" or cylinders, with the bottom perforated for air introduction to the bed. Maintaining even turbulence in a compact box-like bed with side walls and corners is extremely difficult. Equalized supply of air to all "nozzles", and maintenance of full fluidization and even turbulence throughout the bed, is the goal. If not achieved, "slumping" or collapse of the bed can result. Combustion efficiency is highly dependent on even distribution and turbulence.

The importance of maintaining uniform fluidization must be emphasized, particularly when non-uniform fuels, fuels with coarse ash, etc. are burned. If anything dampens the fluidizing action, partial slumping of the bed results, with localized hot spots, or combustion, and corrosion potential resulting. The rectangular box-like present FBCs are difficult configurations in which to maintain this even fluidization and air distribution.

A typical FBC burner has a rectangular or cylindrical firebox, with a relatively high bed volume to grate surface area relationship. As attempts are made to increase the capacity of FBC burners, this relationship limits the capacity for a given size. To increase capacity, grate area must be increased to provide more fuel feeding and air introduction capacity. The fuel must also be spread out evenly, and sufficient air supplied evenly to create uniform turbulence and fluidization.

The rectangular or cylindrical shape is also likely to have a high vertical dimension. Combustion near the top may have insufficient oxygen just when it is needed for maximum efficiency. Introduction of secondary air at that point is complicated and tends to disturb fluidizing action. Increase in residence time of the burning fuel increases the efficiency of combustion, but if the longer residence time is accomplished by a higher bed dimension, the capacity for a given size will not be improved.

One of the most difficult problems in FBC design is to accomodate changes in heat demand or load, as dictated by external conditions. In some way, the FBC heat output must be "turned down" or "turned up" to match the load, and occasionally this must be done quickly. The "turndown ratio" or maximum to minimum capacity is often 5 to 1 or more.

Turndown is accomplished by several means, usually in combination with one another. Often one method alone is not sufficient to cover the range. Fuel feed can be varied to vary output; however the bed temperature must be maintained within a narrow range. Air supply can be varied; however fluidization and turbulence must be kept in a satisfactory range. The height of the bed, or the amount of contact of the bed with water or air heat transfer tubes can be varied; this is an effective control, but difficult to implement.

In each case, the high volume-to-surface area of the fluidized beds in conventional designs causes sluggishness in responding to changing loads. If too much fuel is in the system, turndown is slow. A deep bed mitigates against major changes in air flow, and the height above or immersion of heat transfer tubes in the bed is limited as a control means because of the limited surface area for heat transfer.

Another major problem area of FBCs is the carryover of fine particles of ash, unburned fuel, and limestone in the exhaust gas stream. These fines must be removed before discharge into the atmosphere, to other heat transfer areas, or to direct driven turbines. In addition, the loss of efficiency of having unburned particles of fuel going up the stack is undesirable. Conventionally, particle removal is effected by cyclone separators, filtration, electrostatic precipitation, and the like. Each of these are cumbersome, costly to build, and costly to operate.

Certain aspects of present FBC design make this carryover problem worse: i.e.: top fuel feed, the use of pulverized coal and limestone, and the high air velocity needed to maintain fluidization and complete combustion in relatively deep fluidized beds. It is contemplated that the exhaust gases can be used for directly driving turbines to produce energy. Erosion problems in the turbines due to particles entrained in the exhaust gases are formidable ones and restrict development of direct drive turbines greatly until the particulate problems are solved.

It is believed that the documents listed immediately below contain information which is or might be considered to be material to the examination of this patent application.

| Patent No. | Inventor | Date |
| --- | --- | --- |
| 3,578,798 | Lappie, et al. | 5/18/71 |
| 3,863,577 | Steever, et al. | 2/04/75 |
| 4,060,041 | Sowards | 11/29/77 |
| 4,161,917 | Jubb | 7/24/79 |
| 4,177,636 | Horgan | 12/11/79 |
| 4,177,742 | Uemura, et al. | 12/11/79 |
| 4,249,472 | Mitchell | 2/10/81 |
| 4,284,401 | Tatebayashi, et al. | 8/18/81 |
| 4,400,150 | Smith, et al. | 8/23/83 |
| 4,419,330 | Ishihara, et al. | 12/06/83 |

The term "prior art" as used herein or in any statement made by or for applicant(s) means only that any document or thing referred to as prior art bears, directly or inferentially, a date which is earlier than the effective filing date hereof.

No representation is made that any of the above-listed documents is part of the prior art, or that a search has been made, or that no more pertinent information exists.

Copies of the above-listed documents are supplied to the Patent and Trademark Office herewith. Each of the documents relates to Fluidized Bed Combustion devices having one or more of the characteristics set forth above.

SUMMARY OF THE INVENTION

The method and apparatus of the present invention provides the advantages of the prior art while at the same time overcoming a number of previously unsolved problems and limitations. The method provides for injecting the fuel into the combustion chamber at a desired height relative to the fluidized bed preferably in most cases at the bottom. The fuel is injected radially and tangentially outward throughout a complete 360° arc, into an annular combustion chamber containing the fluidized bed, assuring a uniform distribution of the fuel throughout the fluidized bed.

The method also injects primary air into the bottom portion of the fluidized bed in a plurality of jets having both tangential and upward components of motion calculated to create even turbulence and boiling action throughout the bed and to impart rotary motion to the bed within the annular combustion chamber so as to promote further uniform mixing of the fuel in the particulate bed.

The apparatus of the present invention provides a compact fluidized bed combustion apparatus having an annular combustion chamber with a uniform annular space for the sand bed where fluidization and combustion takes place; with the combustion chamber being defined by coaxially spaced cylindrical inner and outer walls, a top closure wall, and an underlying grate having multiple perforations through the portions of the grate underlying the combustion zone.

Primary air under pressure is supplied to the perforations in the grate, and these perforations are shaped to direct the jets of air passing therethrough tangentially and upwardly into the combustion chamber so as to blow and distribute the primary air uniformly through the fluidized bed, and further to impart rotary motion to the fluidized bed for uniform mixing of the components of the bed.

A spinning fuel distributor disk is mounted just above the grate with its axis coincident with the axis of the annular combustion chamber so that fuel dropping through the space enclosed by the interior wall of the chamber impinges upon the spinning disk and is hurled outwardly below the lower edge of the inner combustion chamber wall and into the lowermost portion of the fluidized bed, this action amounting to injection of the fuel equally around the entire circumference of the combustion chamber so as to accomplish uniform distribution of the fuel into the fluidized bed.

For compactness and simplicity of design, the fuel distributor disk is mounted on the upper end of a coaxial upwardly extending shaft driven by a motor positioned below the combustion chamber. The primary air is supplied by a blower which is concentric with and attached to the upwardly extending output shaft from the motor. With this construction, the blower and disk are driven by the motor at the same variable speed of rotation.

Heat transfer means is provided in the form of conduits adapted to contain a heat transfer fluid medium and located closely adjacent to or in the fluidized combustion bed.

It is therefore a principal object of the present invention to provide a method and apparatus in which air, fuel and sorbents are evenly distributed to a fluidized combustion bed, and the bed is manipulated to keep the various components evenly distributed therein for efficient combustion.

Another object of the present invention is to provide a method and apparatus of the character described in which the fluidized bed is rotated in an annular chamber disposed about a vertical axis for further facilitating mixing of the components of the bed and effecting even and relatively complete combustion of the combustible components.

A further object of the present invention is to provide an apparatus of the character described providing a combustion chamber, fuel feeding means, and air delivery means in a simple, unitary design.

A still further object of the present invention is to provide a method and apparatus of the character described which is adapted for feeding and distributing fuel, sorbent, and air into the combustion zone uniformly, and is adapted for maintaining uniform fluidization of the fluidized bed.

Another object of the present invention is to provide a method and apparatus of the character described capable of utilizing a variety of low quality fuels without major changes in the basic arrangement and method.

Yet another object of the present invention is to provide a FBC unit in which the capacity of heat output is very high in relationship to the size, cost, and complexity of the unit.

A further object of the present invention is to provide a method and apparatus of the character set forth capable of readily controlling heat output to match the external load requirements.

A still further object of the present invention is to provide a FBC unit having efficiently controllable heat transfer from the combustion zone to the working medium and in which emissions of noxious gases and particulants is readily controllable to acceptable levels.

In the method of the present invention, a bed of noninflammable particulate material is confined in an annular combustion chamber, the bed is heated to a temperature sufficient to sustain combustion of the fuel to be burned, the bed is fluidized by blowing multiple jets of air into the bottom of the bed, the fuel is forcibly injected laterally into the bed about a 360° periphery for even distributing the fuel into the bed. Desirably, rotary movement of the bed in the annular combustion chamber is accomplished by causing the jets of air to be blown into the chamber with upward and tangential components of motion.

The method of the present invention also provides for evenly distributing the fuel into the fluidized bed with tangential components of motion for further imparting rotating movement to the fluidized bed within the annular combustion chamber.

The present method also contemplates injecting the fuel into the lower portion of the fluidized bed for most purposes. However, the present method also contemplates injecting the fuel into the fluidized bed medially of the height of the bed for burning certain types of fuel, and further contemplates forcibly injecting the fuel into the annular combustion chamber above said fluidized bed for accomplishing top feeding of fuel materials particularly adapted for such top feeding.

BREIF DESCRIPTION OF THE DRAWINGS

Figure 1:
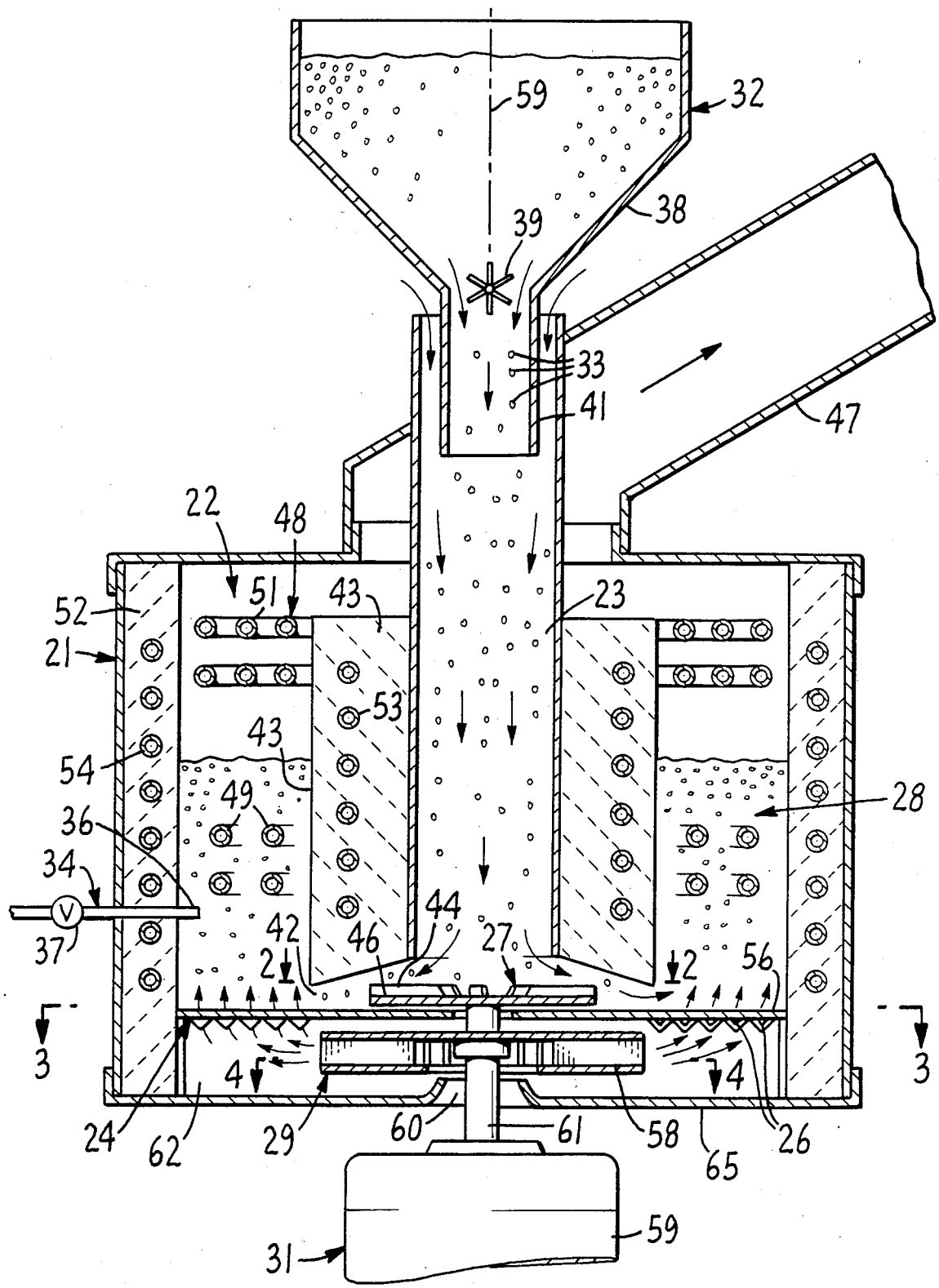
FIG. 1 is a schematic vertical cross-sectional view through a fluidized bed combustion apparatus constructed in accordance with the present invention.
Figure 2:
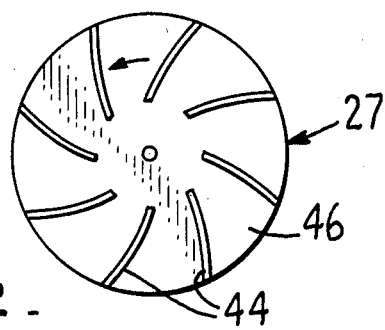
FIG. 2 is a plan sectional view taken substantially on the plane of Line 2—2 of FIG. 1.

While only the preferred forms of the invention are illustrated in the drawings, it will be apparent that various modifications could be made without departing from the ambit of the claims.

DETAILED DESCRIPTION OF THE PREFERRED EMBODIMENTS OF THE APPARATUS

As may be seen in the accompanying drawings, the fluidized bed combustion apparatus of the present invention provides wall means 21 defining an annular combustion chamber 22 having a substantially vertical axis and a coaxially extending central opening 23, grate means 24 extending horizontally across the lower end of said combustion chamber and formed with a plurality of air supply openings 26 therethrough, disk means 27 mounted for rotation above the grate means 24 about an axis coincident with the vertical axis of the combustion chamber 22, a bed 28 of non-combustible particulate material in the combustion chamber above the grate means 24, air supply means 29 formed for forcing air under pressure upwardly through the air supply openings 26 in the grate means 24 to fluidize the bed 28, drive means 31 operatively connected to and formed for rotating the disk means 27, and fuel feed means 32 at the central opening 23 in wall means 21 formed for depositing fuel on the disk means 27 whereby rotating of the latter centrifugally distributes the fuel 33 into the annular combustion chamber 22 above the grate means 24.

Ignition means 34 is adapted for connection to a source of gaseous fuel under pressure and has burner tips 36 projecting into the fluidized bed 28 so that flame from burner tips 36 will heat the non-combustible particulate material of the bed 28 to temperatures high enough to effect combustion of the fuel 33 in the fluidized bed environment. Once the fuel 33 is burning in the fluidized bed, the desired temperature is maintained thereby, and the ignition means 34 can be shut off at valve 37. The primary air blown upwardly through the air supply openings 26 in the grate means 24 supplies the necessary oxygen for combustion and fluidizes the bed 28 at the same time.

In the form of the invention illustrated in FIG. 1 of the drawings, the fuel feed means 32 includes a hopper 38 containing the fuel and having a remote controlled rotary metering valve 39 at its lower end. Fuel 33 passing through valve 39 falls downwardly under the influence of gravity through a conduit 41 and thence through the central opening 23 and onto the whirling disk means 27 which throws the fuel radially and tangentially outward through the fuel and air gap 42 provided between the lower end of cylindrical inner wall 43 and the underlying grate means 24. Secondary air passes through the central opening 23 and is impelled laterally outwardly by the whirling disk means 27 along with the fuel falling onto the disk means. Thus, the secondary air and fuel are distributed evenly through the full 360° of the fuel and air gap 42. This lateral distributing action on both the fuel and the secondary air is facilitated by vanes 44 formed on the upper surface of a disk 46 forming part of the disk means 27. The secondary air from the vanes on the disk is used to match the pressure of the air inside the combustion zone, reventing backflow inwardly through the fuel and air gap 42.

The hot gases of combustion flow upwardly through the bed 28 into the upper portion of the combustion chamber 22 and from there pass out of the unit through flue 47. Heat exchange means 48 is provided at the combustion chamber 22 for receiving and removing heat energy from the fluidized bed. Heat transfer into the working medium is accomplished by one or more of the following means:

1. Radiation, conduction and convection into tubes 49 positioned in the fluidized bed 28.
2. Radiation and convection into tubes 51 positioned within the combustion chamber above the fluidized bed 28.
3. Radiation and conduction into the inner wall 43 and/or the outer wall 52, the heat transfer tubes 53 and 54 being located in the inner wall 43 and outer wall 52, respectively.

It should be noted that the walls 43 and 52 can be of either heat insulating or heat non-insulating materials, or both, depending upon the working temperature and other characteristics of the fluidized bed and the results desired to be obtained.

In the form of the invention illustrated in FIG. 1, the cylindrical inner and outer shells or walls 43 and 52 are mounted coaxially in radially evenly spaced relation and with both walls perpendicular to the grate means 24. This uniform annular space lends itself well to a constant, slow circulation of the bed material, which is desirable to avoid hot spots, uneven bed height, undesirable stratification, and slumping of the bed. This concentricity is preferable to match the evenness of fuel and air distribution accomplished in the present apparatus.

Figure 3:
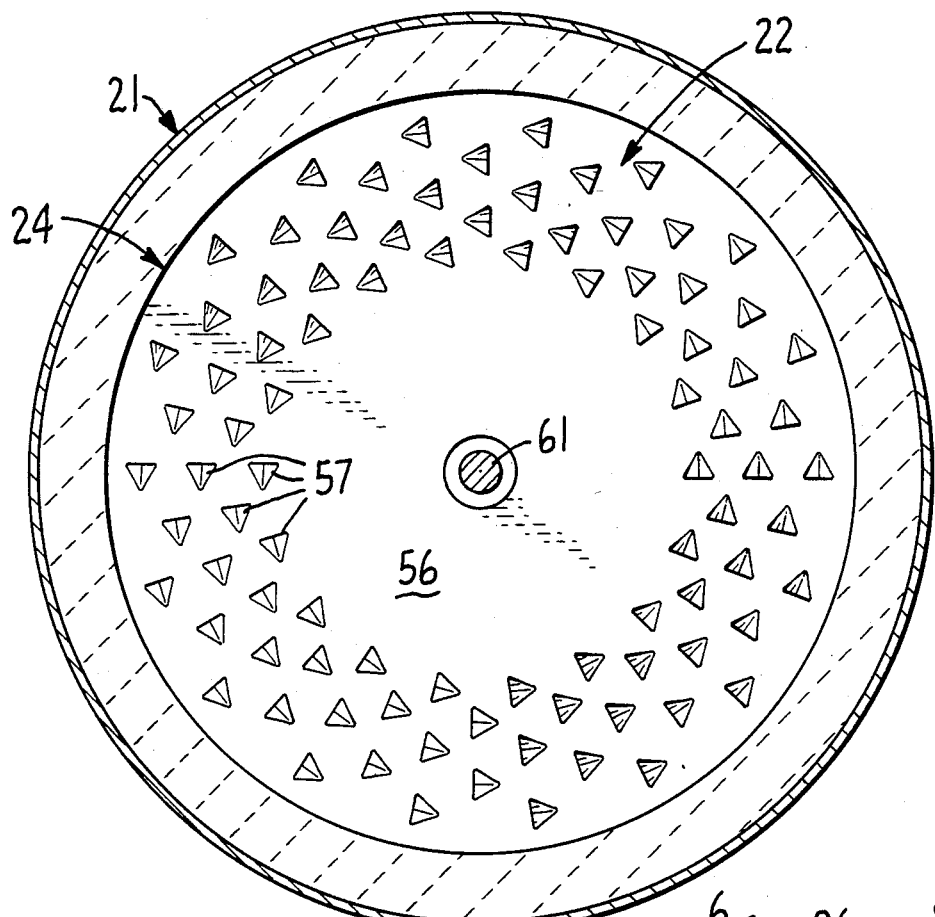
FIG. 3 is a plan sectional view taken substantially on the plane of Line 3—3 of FIG. 1.
Figures 5, 6:
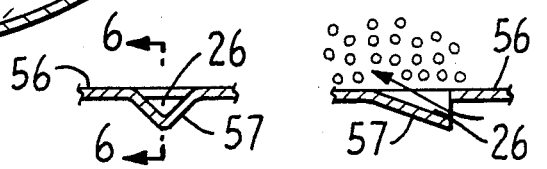
FIG. 5 is a fragmentary enlarged cross-sectional view taken at the entrance to an opening through a grate forming part of the apparatus of FIG. 1.
FIG. 6 is a fragmentary enlarged sectional view taken substantially on the plane of Line 6—6 of FIG. 5.
Figure 4:
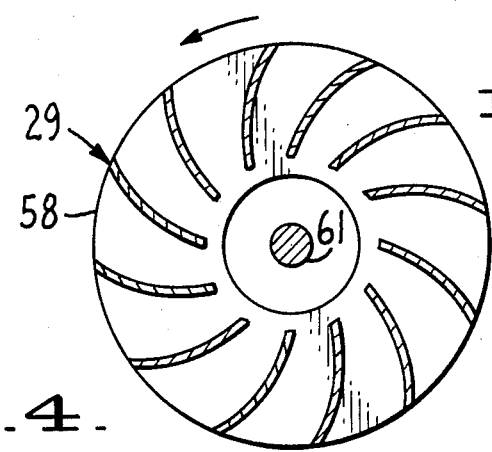
FIG. 4 is a plan sectional view taken substantially on the plane of Line 4—4 of FIG. 1.

The grate means is here shown in the form of a circular plate 56 having the air supply openings 26 formed therethrough evenly distributed over the annular portion of the plate 56 underlying the annular combustion chamber 22. In the form of the invention shown in the drawings, the structure of the air supply openings 26 through the plate 56 can best be seen in FIGS. 3, 5 and 6. The air supply openings 26 are formed for imparting tangential and upward components of movement to the streams of primary air passing from the air supply means 29 through the openings 26 and into the fluidized bed combustion chamber 22.

As here shown, each of the air supply openings 26 is in the form of a perforation through the plate 56 and preferably is made by forming a radially extending slit through the plate 56 and downwardly deforming a portion of the plate at one side of the slit to provide a downwardly extending open air scoop 57 for the perforation.

The tangential direction of the scoops 57 matches the direction of air flow from the air supply means 29, thus permitting air flow through the openings with minimum change of direction and pressure loss. The resulting air jets enter the combustion chamber angled upwardly, see FIG. 6, and tangential to the curvature of the combustion chamber. The air scoop with a vertical opening helps prevent backflow of the particulate bed material when the air is shut off.

While the slots are preferably oriented for tangential flow of air, it should be understood that they could be angled away from true tangency in a number of patterns to accomplish better fuel mixing, better mixing of bed material, improved evenness of temperature, and to avoid any "stratification" in any particular apparatus having such problems. The upward angle could also be varied from slot to slot and row to row, or in any other desired pattern.

Preferably, and as here shown, the air supply means 29 includes a blower 58 rotatable about the vertical axis 59 of the combustion chamber 22 and formed to blow air tangentially from the blower, the air scoops 57 having their open ends facing the air under pressure eminating from the blower 58.

The drive means 31 preferably includes an electric motor 59 mounted below the combustion chamber 22 in coaxial relation thereto, the motor 59 being provided with an upwardly extending drive shaft 61. The blower 58 is mounted on and secured to the drive shaft 61 in spaced relation below the grate plate 56. The arrangement used is very efficient and low in cost. The air entry to the blower wheel 58 through coaxial opening 60 in bottom wall 65 is convenient and is preferred, although other arrangements could be used. The motor 59 can easily be kept in a cool area by mounting it in the manner shown and described herein. Only when pre-heating of air is wanted would top entry be considered, and even this pre-heating of the air can be accomplished with the illustrated bottom entry.

For control of air flow, several different means are used such as conventional inlet dampers, outlet dampers, or motor speed control (not shown). Inlet dampers are less efficient because pressure drop across the damper wastes energy, and inlet throttling is not easily controllable. Outlet dampering is quite complex in this design, and could negate many of the advantages arising from the simplicity of the design. Motor speed control permits very fine control of air delivery and, although costly, is the preferred way of achieving load control. Adequate fluidization can be maintained over a wide range of air pressure, and therefore air control by means of motor speed control is the preferred way to control the amount of combustion air for load control purposes.

While the fuel feed disk 27 is here shown as being mounted for joint rotation with the blower 58, it should be appreciated that the disk 27 and blower 58 can be operated independently with different drives, and that the secondary air means can be separate from the fuel feed disk 27. Thus, the fuel feed disk 27, the blower 58 and the secondary air supply means can be driven jointly, as shown here; or each can be driven independently; or in any pair in combination.

Figure 7:
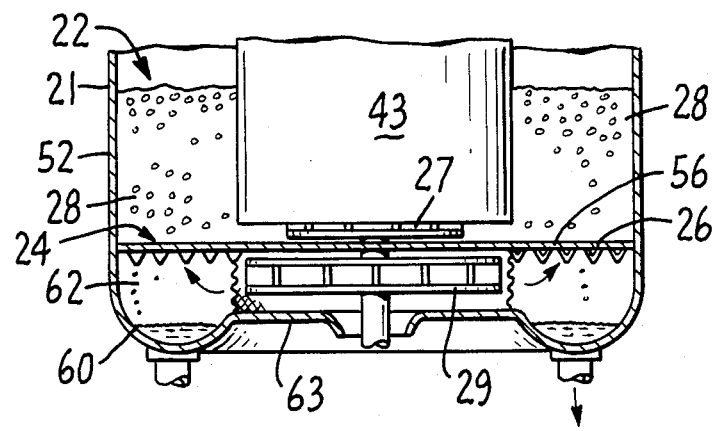
FIG. 7 is a schematic cross-sectional view of the lower portion of an annular combustion chamber and associated apparatus constructed in accordance with the present invention, but showing a modified form thereof.

The blower chamber 62 illustrated in FIG. 1 of the drawings is of simple, low height, cylindrical shape. Further improvement of air flow up through the air supply openings 26 may be accomplished by shaping the bottom wall 63 of blower chamber 62 to curve upwardly to meet outer wall 52 in the manner shown in FIG. 7 of the drawings. Return of bed material which might drop through the air supply openings 26 may be helped by a bottom shape such as that shown in FIG. 7 of the drawings wherein the bottom wall 63 is deformed downwardly to provide an annular trough 60 underlying the bed 28 in combustion chamber 22.

The fuel distribution disk means 27 is also rotated by and is mounted on the upper end of drive shaft 61. With both the disk means 27 and the blower 58 secured to the drive shaft for joint rotation, speeding up or slowing down the motor to control the speed of the blower 58, and hence the amount of air supplied to the fluidized bed 28, correspondingly speeds up or slows down the volume of secondary air from vane means 44 into the fluidized bed 28. The even distribution of fuel will occur over a wide range of disk speeds; the volume of fuel is controlled by the rate established by fuel feed means 39.

The air flow from the vanes 44 may help carry the fuel outward; however the fuel can be thrown outwardly without any vanes at all. In a particular installation, the height, shape, and inner and outer diameters of the vanes are varied to match the conditions encountered, and to correspond with the output of the primary air blower. With proper matching of air flow down the central opening 23, fuel dust is pulled down, giving the advantage of dust-free operation. Although the primary advantage of the present invention is to burn low quality solid fuels it is entirely practical to burn liquid or gaseous fuels. In the case of gaseous fuels, direct injection of the gas into the bed is preferred and the fuel disk and associated construction may be eliminated or used only for supplying sorbent or other materials to the fluidized bed.

For liquid fuels, the secondary air fan provided by the vanes 44 may be retained to provide secondary air, and the fuel is dripped, sprayed, or flowed onto the disk, which sprays it out uniformly in all directions through the fuel and air gap 42 and into the fluidized bed 28. Alternatively, the fuel is sprayed outwardly through the air gap, or even directly into the Some of the advantages of the apparatus are still realized bed. with liquid or gaseous fuels, such as evenness of fuel and air distribution, a circulating bed with good mixing and turbulence, good heat transfer, high capacity in a simple, low cost design, the possible use of low grade fuels not suitable for other burners, and the possibility of using of sorbents or catalysts to reduce pollutants in combustion. Mixtures of solid, liquid and gaseous fuels also may be used, with corresponding minor changes in the construction of the FBC unit.

Figure 8:
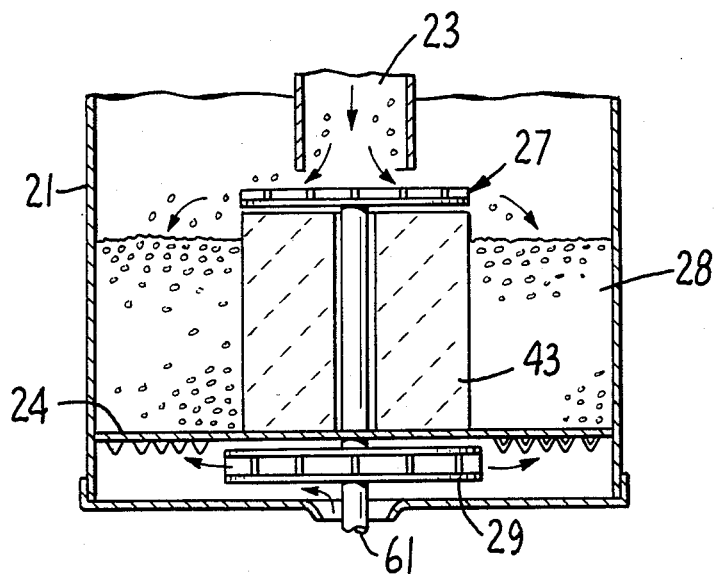
FIG. 8 is a view similar to that of FIG. 7, but illustrating another form of the invention in which fuel is fed into the combustion chamber above the fluidized bed.
Figure 9:
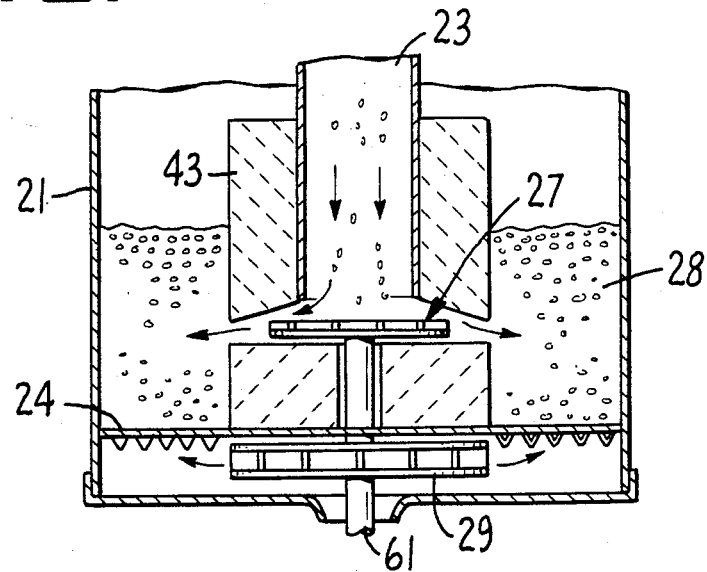
FIG. 9 is a view similar to that of FIG. 8, but illustrating another modified form of the invention in which the fuel is fed into said fluidized bed medially of its height.

The fuel distribution disk means 27 alternatively can be used for top feeding of the fuel, or even for feeding at a mid position in the bed, with simple mechanical adaptation of the basic design. A top feed arrangement is illustrated in FIG. 8 of the drawings. For top fuel feed, no additional air is usually added. Distribution occurs uniformly over a complete 360° arc, producing, in effect, an infinite number of fuel feeding points. For mid-bed feed, some additional air is needed in order to maintain the bed in a uniformly fluidized state. A modification of the present apparatus illustrating mid-bed feed is illustrated in FIG. 9 of the drawings.

Figure 10:
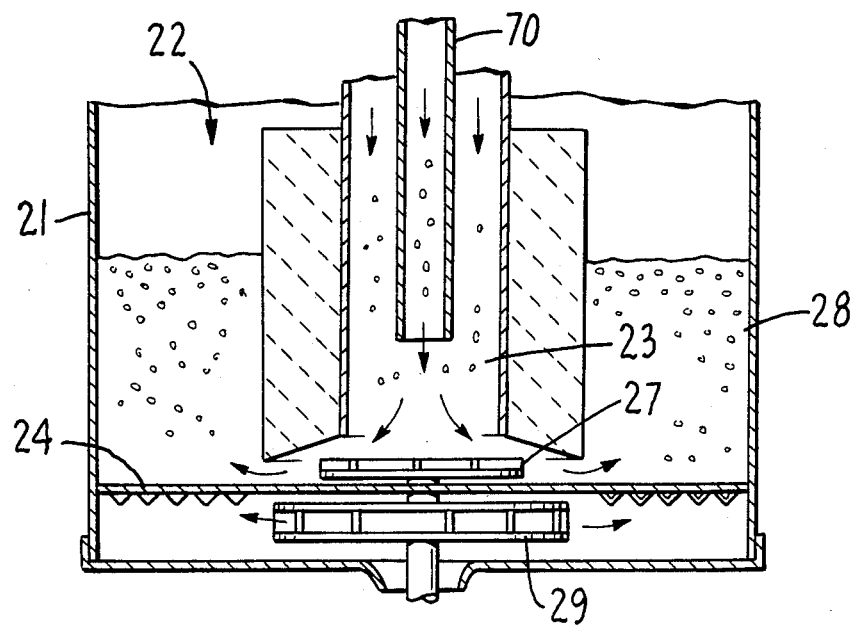
FIG. 10 is a view similar to that of FIG. 7, but showing the relative positioning of a sorbent feed conduit.

As pointed out above, at times it is important or necessary to add materials other than sand, fuel and air to the fluidized bed. For example, sorbent materials such as limestone should be added when burning high sulfur fuels. Also, when burning fuels tending to cause pollution, it is sometimes necessary to supply catalysts to the bed. A modification of the apparatus to provide for adding these additional materials is illustrated in FIG. 10 of the drawings wherein fuel or sorbent can be supplied through either the central tube 70 or between tube 70 and the inner wall 43.

Figure 11:
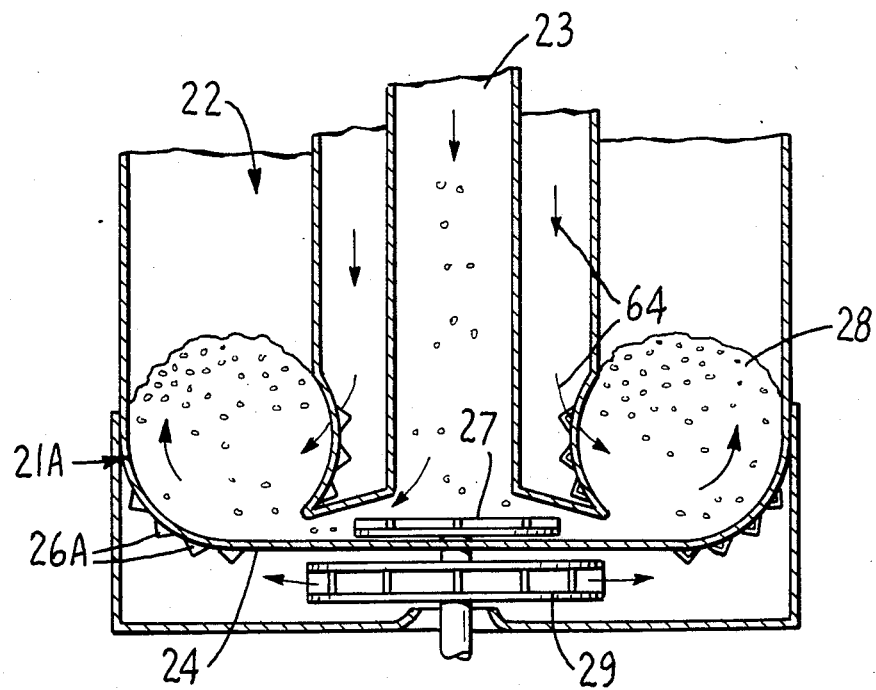
FIG. 11 is a view similar to that of FIG. 7, but illustrating a modified shaping of the lower portion of the annular combustion chamber into a generally toroidal configuration.

While it is preferred for reasons of simplicity of design, etc. to configure the annular combustion chamber in the manner shown in FIGS. 1 through 10 of the drawings, I have found that other configurations can be very effective. For example, FIG. 11 of the drawings illustrates a modification in which the wall means 21A is curved to define a semi-toroidal lower portion of the annular combustion chamber. In this configuration, with proper placing of the air supply openings 26A, and supplying of additional air as indicated by arrow 64, the fluidized bed can be caused to rotate around the axis of the torus as well as around the central axis of the apparatus. This helical-toroidal movement further facilitates and promotes even mixing and distribution of the fuel, sorbents and air in the fluidized bed.

From the foregoing, it should be apparent that the method and apparatus of the present invention provides simple and uncomplicated mechanisms arranged and working together to provide an "infinite" number of under bed fuel feeding points, a full 360° around the fuel air gap. The present invention provides a novel mode of bringing fuel, sorbent, and air together in a well dispersed fashion to obtain improved combustion efficiency, and is highly effective in creating an underfeed of fuel in a manner avoiding and eliminating the problems discussed.

What is claimed is:

1. A fluidized bed combustion apparatus, comprising
   wall means defining an annular combustion chamber having a substantially vertical axis and a coaxially extending central opening,
   grate means extending horizontally across the lower end of said combustion chamber and formed with a plurality of air supply openings therethrough,
   disk means mounted for rotation above said grate means about an axis coincident with said vertical axis of said combustion chamber,
   a bed of non-combustable particulate material in said combustion chamber above said grate means,
   air supply means formed for forcing air under pressure upwardly through said openings in said grate means to fluidize said bed,
   drive means operatively connected to and formed for rotating said disk means,
   and fuel feed means at said central opening in said wall means formed for depositing fuel on said disk means whereby rotation of the latter centrifugally distributes said fuel into said annular combustion chamber above said grate means.

2. A fluidized bed combustion apparatus as described in claim 1 and wherein ignition means is provided formed for heating said bed to a temperature high enough to support combustion of said fuel.

3. A fluidized bed combustion apparatus as described in claim 1, and wherein heat exchange means is provided at said combustion chamber for receiving and removing heat energy from said fluidized bed.

4. A fluidized bed combustion apparatus as described in claim 1, and wherein said wall means has the portion next to said fluidized bed formed of heat insulation material.

5. A fluidized bed combustion apparatus as described in claim 1, and wherein said wall means has the portion next to said fluidized bed formed of material capable of transmitting heat therethrough.

6. A fluidized bed combustion apparatus as described in claim 1, and wherein said grate means comprises a plate having said air supply openings formed therethrough over the annular portion of said plate underlying said annular combustion chamber.

7. A fluidized bed combustion apparatus as described in claim 6, and wherein said air supply openings are provided by perforations through said plate formed for imparting tangential and upward components of movement to streams of air passing from said air supply means through said perforations and into said fluidized bed combustion chamber.

8. A fluidized bed combustion apparatus as described in claim 7, and wherein each of said perforations comprises a radially extending slit through said plate and a downwardly deformed portion at one side of said slit providing a downwardly extending open end air scoop for such perforation.

9. A fluidized bed combustion apparatus as described in claim 8, and wherein said air supply means includes a blower rotatable about a vertical axis and formed to blow air under pressure tangentially therefrom, and said air scoops have their open ends facing the air under pressure emanating from said blower.

10. A fluidized bed combustion apparatus as described in claim 1, and wherein said disk means is provided with raised vanes on its upper surface formed for impinging on fuel deposited on said disk means during rotation of said disk means so as to hurl such fuel outwardly in an even 360° pattern into said fluidized bed contained in said annular combustion chamber.

11. A fluidized bed combustion apparatus as described in claim 10, and wherein said vanes on said disk means are also formed for blowing secondary air into said fluidized bed in said annular combustion chamber along with said fuel for effecting even distribution of materials throughout said fluidized bed.

12. A fluidized bed combustion apparatus as described in claim 7, and wherein said disk means is formed for blowing secondary air into said fluidized bed in said annular combustion chamber, said air from said perforations and said secondary air both having tangential components of movement with respect to said annular chamber so as to tend to cause said fluidized body to rotate in said annular chamber.

13. A fluidized bed combustion apparatus as described in claim 1, and wherein means is provided for evenly distributing said fuel throughout said fluidized bed.

14. A fluidized bed combustion apparatus as described in claim 13, and wherein impelling means is provided for effecting rotational movement of said fluidized bed in said annular chamber.

15. A fluidized bed combustion apparatus as described in claim 3, and wherein said heat transfer means comprises a plurality of fluid medium carrying conduits mounted in said wall means at and higher than said fluidized bed for receiving heat from said fluidized bed and from heated gases above said fluidized bed.

16. A fluidized bed combustion apparatus as described in claim 15, and wherein said fluid medium carrying conduits are positioned adjacent to the inner and outer peripheries of said annular combustion chamber.

17. A fluidized bed combustion apparatus as described in claim 16, and wherein said fluid medium carrying conduits are positioned within said fluidized bed.

18. A fluidized bed combustion apparatus as described in claim 16, and wherein said fluid medium carrying conduits are mounted in said annular combustion chamber in spaced relation above said fluidized bed.

19. A fluidized bed combustion apparatus as described in claim 1, and wherein said drive means comprises
   a motor mounted below said annular combustion chamber in coaxial relation thereto and having an upwardly extending driven shaft,
   said disk means being carried on the upper end of said driven shaft and secured thereto for joint rotation.

20. A fluidized bed combustion apparatus as described in claim 19, and wherein said air supply means comprises a blower secured to said driven shaft for joint rotation.

21. A fluidized bed combustion apparatus as described in claim 1, and wherein said fuel feed means comprises a supply hopper mounted above said combustion chamber, control means on said hopper formed for metering fuel from said hopper on demand, and conduit means formed for receiving said fuel from said control means and channeling such fuel to be deposited on said disk means 22. A fluidized bed combustion apparatus as described in claim 1, and wherein said wall means includes a bottom wall curving upwardly at its periphery to join an outer cylindrical wall defining the outer periphery of said annular combustion chamber 23. A fluidized bed combustion apparatus as described in claim 22, and wherein an annular trough is formed in said bottom wall to receive and collect any material falling through said air supply openings in said grate.

24. A fluidized bed combustion apparatus as described in claim 1, and wherein said disk means is mounted in proximity to said grate and below the inner wall of said wall means.

25. A fluidized bed combustion apparatus as described in claim 1, and wherein said disk means is mounted at a height approximately medially of the height of said fluidized bed.

26. A fluidized bed combustion apparatus as described in claim 1, and wherein said disk means is mounted at a higher level than the top of said fluidized bed for top fuel feed.

27. A fluidized bed combustion apparatus as described in claim 1, and wherein sorbent feed means is provided for feeding sorbent and catalysts and is formed for dropping sorbent and catalyst materials onto said disk means along with said fuel for distribution into said fluidized bed.

28. A fluidized bed combustion apparatus as described in claim 1, and wherein said wall means is curved to define a semi-toroidal lower portion of said annular combustion chamber whereby said fluidized bed rotates toroidally within said lower portion of said annular combustion chamber.

29. A fluidized bed combustion apparatus, comprising
a combustion chamber of annular form having coaxially spaced inner and outer cylindrical walls standing on end and laterally extending top and bottom walls with the space within said inner cylindrical wall providing a fuel feed passage opening through said top wall,
a grate of flattened plate-like form extending across the lower end of said combustion chamber to provide said bottom wall and having a plurality of air supply openings therethrough communicating with said combustion chamber,
a bed of non combustable particulate matter in said combustion chamber and resting on said grate when said bed is not fluidized,
air supply means formed for forcing primary air under pressure upwardly through said air supply openings in said grate to fluidize said bed, and
a fuel distribution disk carried for spinning movement about a vertical axis at the lower end of said fuel feed passage and formed for propelling fuel dropped on said disk from said fuel feed supply passage laterally into said bed.

30. A fluidized bed combustion apparatus as claimed in claim 29, and wherein said air supply means and said air supplly openings are formed to project streams of primary air tangentially and upwardly into said bed to fluidize and to impart rotary motion to said bed.

31. A fluidized bed combustion apparatus as described in claim 29, and wherein said fuel distribution disk is formed for spinning off fuel impinging its upper surface evenly and at high enough velocity to urge discrete particles of fuel evenly into said fluidized bed.

32. A fluidized bed combustion apparatus as described in claim 29, and wherein said air supply means includes a rotary blower, a motor is mounted below said walls and drives a vertically extending shaft, and said fuel distribution disk and said blower are carried on said shaft for rotation therewith.

33. The method of fluidized bed combustion, comprising the steps of
confining a bed of non-inflammible particulate material in an annular combustion chamber,
heating said bed to a temperature sufficient to sustain combustion of the fuel to be burned,
fluidizing said bed by blowing multiple jets of air into the bottom of said bed,
accomplishing rotating movement of said bed in said annular combustion chamber by causing said jets of air to be blown into said chamber with upward and tangential components of motion,
and forceably injecting the fuel to be burned laterally into said bed about a 360° periphery for evenly distributing such fuel into said bed.

34. The method as described in claim 33, and wherein said fuel is forcibly injected into said fluidized bed with tangential components of motion for further imparting said rotating movement to said fluidized bed within said annular combustion chamber.

* * * * *